United States Patent Office 2,902,514
Patented Sept. 1, 1959

2,902,514

BIS-IMINODIACETAMIDOXIMES

Peter L. de Benneville and Charles Samuel Hollander, Philadelphia, Pa., assignors to Rohm & Haas Company, Philadelphia, Pa., a corporation of Delaware No Drawing. Application December 23, 1957
Serial No. 704,334

9 Claims. (Cl. 260—564)

This invention deals with specific bis-iminodiacetamidoximes as new compositions of matter. It further deals with a method for the preparation of the specific bis-iminodiacetamidoximes. The compounds of this invention may be represented by the formula

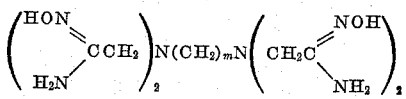

in which $m$ is an integer of 2 to 8. The integer $m$ defines the size of the alkylene bridge between the two —NH— groups and may typically be ethylene, trimethylene, propylene, butylene, hexylene, or octylene. The bridge defined by the integer $m$ may be straight or branched chain as long as there are two carbon atoms between the nitrogen atoms on either side of the alkylene bridge.

The present compounds are prepared by reacting a hydroxylamine salt with an alkylene bis-iminodiacetonitrile in molecular proportions of substantially four of the former to one of the latter. While any of the common hydroxylamine salts may be employed, it is preferred to use the hydrochloride, the hydrobromide or sulfate or the like. While it is possible to use free hydroxylamine in this reaction, it is preferred to employ the salt form as previously stated since the reaction is more readily consummated and the salt form of hydroxylamine is more commonly and economically available.

The reaction is effected in good yields approaching quantitiveness without the necessity of or desire for a catalyst. Temperatures of about 0° to 100° C. are conveniently employed. It is desirable to employ an inert volatile solvent such as water or a lower alkanol such as methanol, ethanol, propanol, butanol, or convenient mixtures thereof since better contact between the reactants is thereby achieved. The reaction is exothermic in nature and one skilled in the art is able to accurately follow the course of the reaction by observing the heat evolved. After the heat of reaction has dissipated, there is added equivalent base in order to free the product from its acid salt. In this respect, any common basic agent may be employed such as sodium carbonate, potassium carbonate, and the like. In many cases, the free alkylene bis-iminodiacetamidoxime precipitates at this point as a crystalline solid. In some cases it remains in solution, and in order to isolate the product, one then removes the solvent by stripping, preferably under reduced pressure, or if an ancohol is employed, salt formed from the equivalent of the acid salt of the hydroxylamine is filtered off first and then the alcohol is removed by stripping, preferably at reduced pressure. The products are crystalline in nature and they may be recrystallized from suitable solvents such as lower alkanols or mixtures thereof.

Typical reactants that may be employed in addition to the hydroxylamine salts previously referred to include ethylene-bis-iminodiacetonitrile, trimethylene-bis-iminodiacetonitrile, butylene-bis-iminodiacetonitrile, hexylene-bis-iminodiacetonitrile, octylene-bis-iminodiacetonitrile, and cyclohexylene-bis-iminodiacetonitrile.

The compounds of this invention are effective fungicides against *Stemphylium sarcinaeforme* and *Monilinia fructicola* wherein substantially 100% control is observed with concentrations of about 0.1% as evaluated according to standard test methods. Substantial inhibition against these fungi is observed at much lower concentrations. The compounds are especially effective against *Monilinia fructicola* even in concentrations as low as about 0.005%. Simultaneously, these compounds have little, if any, appreciable phytotoxicity. They also show ability to sequester iron and other heavy metals.

The compounds of this invention, as well as the method for their preparation, may be more fully understood from the following example which is offered by way of illustration and not by way of limitation. Parts by weight are used throughout.

*Example*

A mixture is made of 43 parts of ethylene-bis-iminodiacetonitrile and 80 parts of methanol. There is added to this a solution of 56 parts of hydroxylamine hydrochloride and 60 parts of water at room temperature over a period of 15 minutes. The mixture is stirred for one hour and then there is slowly added 42 parts of solid sodium carbonate. The mixture is stirred overnight for a period of 19 hours. The resulting solid is removed by filtration and washed with 200 parts of water. The solid is a colorless to slightly pink crystalline material melting with decomposition at 186° to 187° C. The product corresponds to ethylene bis-iminodiacetamidoxime.

The above procedure is repeated substituting 54 parts of hexamethylene bis-iminodiacetonitrile. There is obtained a colorless solid which is identified as hexamethylene bis-iminodiacetamidoxime.

In a similar manner using 46 parts of propylene-bis-iminodiacetonitrile (N,N,N',N'-tetracianomethyl-1,2-propylenediamine), there is obtained a colorless solid corresponding in composition to propylene-bis-iminodiacetamidoxime.

We claim:
1. As a composition of matter, the compound having the formula

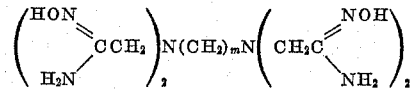

in which $m$ is an integer of 2 to 8.

2. The compound of claim 1 in which $m$ is the integer 2.

3. The compound of claim 1 in which $m$ is the integer 3.

4. The compound of claim 1 in which $m$ is the integer 6.

5. A method for the preparation of a compound having the formula

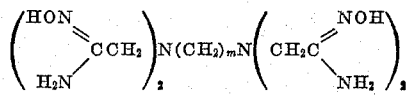

in which $m$ is an integer of 2 to 8 which comprises reacting in a temperature range of 0° to 100° C., a hydroxylamine salt and an alkylene bis-iminodiacetonitrile in which the alkylene portion contains 2 to 8 carbon atoms.

6. A method for the preparation of a compound having the formula

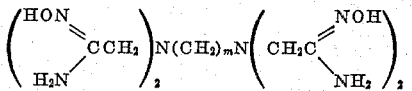

in which $m$ is an integer of 2 to 8 which comrises reacting in the temperature range of 0° to 100° C., a hydroxylamine salt and an alkylene bis-iminodiacetonitrile in molecular proportions of substantially four of the former to one of the latter in the presence of an inert volatile solvent, said alkylene group containing from 2 to 8 carbon atoms.

7. A method for the preparation of a compound having the formula

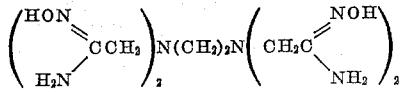

which comprises reacting in the temperature range of 0° to 100° C., a hydroxylamine salt and ethylene bis-iminodiacetonitrile in molecular proportions of substantially four of the former to one of the latter in the presence of an inert volatile solvent.

8. A method for the preparation of a compound having the formula

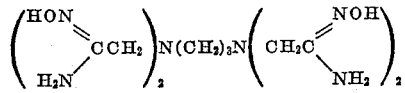

which comprises reacting in the temperature range of 0° to 100° C., a hydroxylamine salt and propylene bis-iminodiacetonitrile in molecular proportions of substantially four of the former to one of the latter in the presence of an inert volatile solvent.

9. A method for the preparation of a compound having the formula

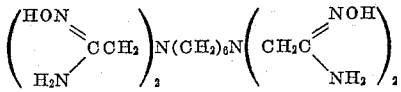

which comprises reacting in the temperature range of 0° to 100° C., a hydroxylamine salt and hexylene bis-iminodiacetonitrile in molecular proportions of substantially four of the former to one of the latter in the presence of an inert volatile solvent.

No references cited.